(12) United States Patent
Lin

(10) Patent No.: US 8,165,589 B2
(45) Date of Patent: Apr. 24, 2012

(54) WIRELESS TERMINAL, WIRELESS COMMUNICATION SYSTEM AND METHOD FOR CONTROLING WIRELESS TERMINAL TO SWITCH BETWEEN NETWORKS IN WIRELESS COMMUNICATION SYSTEM

(75) Inventor: Ching-Yu Lin, Hsinchu (TW)

(73) Assignee: Qisda Corporation, Taoyuan County (TW)

( * ) Notice: Subject to any disclaimer, the term of this patent is extended or adjusted under 35 U.S.C. 154(b) by 437 days.

(21) Appl. No.: 12/497,554

(22) Filed: Jul. 3, 2009

(65) Prior Publication Data

US 2010/0002667 A1 Jan. 7, 2010

(30) Foreign Application Priority Data

Jul. 4, 2008 (TW) .............................. 97125261 A

(51) Int. Cl.
*H04W 36/00* (2009.01)
(52) U.S. Cl. ...................... 455/444; 455/432.1; 455/436; 455/552.1; 370/338; 370/332
(58) Field of Classification Search ............... 455/552.1, 455/436–445, 67.11, 458, 461; 370/338, 370/331, 332
See application file for complete search history.

(56) References Cited

U.S. PATENT DOCUMENTS

| 6,532,221 | B1* | 3/2003 | Kim et al. | 370/332 |
| 2001/0021642 | A1* | 9/2001 | Iida | 455/67.1 |
| 2006/0159048 | A1* | 7/2006 | Han et al. | 370/331 |
| 2007/0218906 | A1* | 9/2007 | Melia et al. | 455/436 |
| 2008/0090595 | A1* | 4/2008 | Liu et al. | 455/461 |
| 2008/0130597 | A1* | 6/2008 | Kalhan | 370/338 |
| 2008/0280630 | A1* | 11/2008 | Kalhan et al. | 455/458 |

* cited by examiner

*Primary Examiner* — Lana N Le
*Assistant Examiner* — Golam Sorowar

(57) ABSTRACT

The invention provides a mobile terminal having a first network module for connecting to a wireless wide area network (WWAN) and a second network module for connecting to a wireless local area network (WLAN). The WWAN and the WLAN connect to a control center. The mobile terminal connects to the WLAN and detects a WWAN signal level of a WWAN signal transmitted by the WWAN and a WLAN signal level of a WLAN signal of a WLAN signal transmitted by the WLAN. The mobile terminal calculates a modified signal level according to a first compensation value and the WLAN signal level and sends the modified signal level and the WWAN signal level to the control center. If the modified signal level is smaller than a first threshold and the WWAN signal level is greater than a second threshold, the control center sends a switch command to the mobile terminal and the mobile terminal switches the connection from the WLAN to the WWAN.

15 Claims, 3 Drawing Sheets

WIRELESS TERMINAL, WIRELESS COMMUNICATION SYSTEM AND METHOD FOR CONTROLLING WIRELESS TERMINAL TO SWITCH BETWEEN NETWORKS IN WIRELESS COMMUNICATION SYSTEM

BACKGROUND OF THE INVENTION

1. Field of the Invention

The invention relates to a dual mode mobile terminal operating in a communication system having a wireless wide area network and a wireless local area network and, more particularly, to a method for adjusting a coverage of the wireless local area network.

2. Description of the Prior Art

In recent years, new communication technologies are developed and customers can select different kinds of personal communication systems to use voice/data services. The communication systems are, for example, GSM/WCDMA/CDMA2000 wireless wide area networks (WWAN) and voice service over wireless local area networks (WLAN).

Fixed Mobile Convergence (FMC) is developed by integrating a WWAN, a WLAN and a control center into a communication system. A FMC mobile terminal can be switched between WWAN and WLAN according to the signal levels transmitted by the WWAN and the WLAN. Normally. Because the fee of WWAN is high, the user would prefer to use the service of WLAN, especially when using a roaming service in different countries with different operators. When the mobile terminal connects the WLAN, the user may pay less fee than using the WWAN. However, the coverage of the WLAN is smaller than the WWAN's. When the mobile terminal passes through the boundary of the coverage of WLAN, the mobile terminal may switches from WLAN to WWAN. If the user frequently stays in the boundary, the mobile terminal may be forced to switch to WWAN and the user should pay much money even the WLAN can provide communication services.

In another hand, the voice quality of the WLAN is not good as the voice quality of the WWAN because of network delays. Some user prefers communicates within WWAN because of the voice quality. The user may be want to reduce the coverage of the WLAN.

In FMC networks, the mobile terminal sends the detected signal levels to the control center through the WWAN or the WLAN. The control center selects one of the networks is suitable for communicating according comparing the levels of received signals with the stored thresholds. As the thresholds are fixed, the coverage of the WLAN is fixed for all mobile terminal. The switching functions from the WLAN to the WWAN are controlled by the control center. Currently, there is no way for users to adjust the coverage of the WLAN, when the users want to extend or reduce the coverage of the WLAN.

In order to solve the aforesaid problems, this invention want to provide a method and a mobile terminal to make the coverage of the WLAN can be adjustable by the mobile phone user without changing the original settings of the control center.

SUMMARY OF THE INVENTION

It is therefore an object of the invention to provide a mobile terminal selectively connecting a wireless wide area network and a wireless local area network. The mobile terminal provides an input interface for users to adjust the coverage of the WLAN.

According to the invention, a mobile terminal is able to select one of a wireless wide area network (WWAN) or a wireless local area network (WLAN) for voice/data communicating. The WWAN, for example a GSM network, contains a plurality of the first base stations. Each communication area of the first base station is about 2 to 10 km in a normal GSM system. The WLAN contains at least one second base station. The mobile terminal connects to the second base station with a WLAN coverage and to one of the first base station with a WWAN coverage. In this invention the WWAN coverage covers the WLAN coverage.

The WWAN and the WLAN connecting to a control center. The control center can be a VLR (Visitor Location Register) or a HLR (Home Location Register). The control center controls the switching functions of mobile terminals in the wireless system. The wireless system is a fixed-mobile convergence system.

The mobile terminal with dual modes has a first network module, a second network module, a processing module and an input interface. The first network module builds up a connection with the WLAN. The first network module is a WLAN RF receiver for receiving a first signal transmitted by the WLAN and detecting a first signal level of the first signal. The second network module is a WWAN RF receiver for receiving a second signal transmitted by the WWAN and detecting a second signal level of a second signal. The processing module calculates a third signal level according to a first compensation value and the first signal level. The processing module sends the third signal level and the second signal level to the control center through the WWAN or the WLAN. When the third signal level is smaller than a first threshold and the second signal level is greater than a second threshold, the control center sends a switch command to the processing module. The mobile terminal receives the switch command and switches the connection from the WLAN to the WWAN. The control center stores the first threshold and the second threshold for controlling switching functions of a plurality of mobile terminals in the system.

The mobile terminal contains many operating modes, each of the operating modes is related a compensation value. The input interface is used for selecting a target operating mode from the operating modes. If the user want to extend the coverage of the WLAN, the third signal level is the first signal level adding the compensation value. If the user want to reduce the coverage of the WLAN, the third signal level is the first signal level minus the compensation value.

The control center receives the third signal level and the second signal level from the mobile terminal. The control center compares the third signal level to a first threshold and compares the second signal level to a second threshold. When the second signal level greater than the second threshold, that's mean the second signal level is strong enough for the mobile terminal making a connection to the WWAN. When the third signal level lower than the first threshold, that's mean the control center assumes the WLAN signal level is too low and needs to handle the connection from the WLAN to WWAN. In the prior art, the mobile terminal sends the first signal level to determine whether the mobile terminal is need to handoff. But in this invention, the mobile terminal sends the third signal level instead of the first signal level. The user can modify the third signal level for adjusting the coverage of the WLAN. It is no need to change the original settings of the control center. This invention can be implemented on the mobile terminal only without changing the network setting.

This invention provides a method for a mobile terminal selectively connecting to a wireless wide area network (WWAN) and a wireless local area network (WLAN). A user can adjust the coverage of the WLAN by the interface of the mobile terminal. The WWAN and the WLAN connect to a control center to form a wireless system. The wireless system a fixed-mobile convergence system.

The method comprises steps: (a) The mobile terminal makes a connection to the WLAN; (b) The mobile terminal detects a first signal level of a first signal transmitted by the WLAN and a second signal level of a second signal transmitted by the WWAN; (c) The mobile terminal calculates a third signal level according to a first compensation value and the first signal level; and (d) The mobile terminal sends the third signal level and the second signal level to the control center; When the third signal level is smaller than a first threshold and the second signal level is greater than a second threshold, the control center sends a switch command to the mobile terminal and the mobile terminal switches the connection from the WLAN to the WWAN. The control center stores the first threshold and the second threshold and controls switching functions of a plurality of mobile terminals in the wireless system.

The mobile terminal stores many operating modes in the memory of the mobile terminal, each of the operating modes is related a compensation value. The mobile terminal has an input interface for selecting a target operating mode from the operating modes. When the target operating mode is extending a communication coverage of the WLAN, the third level is the first level plus the first compensation value. And when the target operating mode is reducing the communication coverage of the WLAN, the third level is the first level minus the first compensation value.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Figure 1:
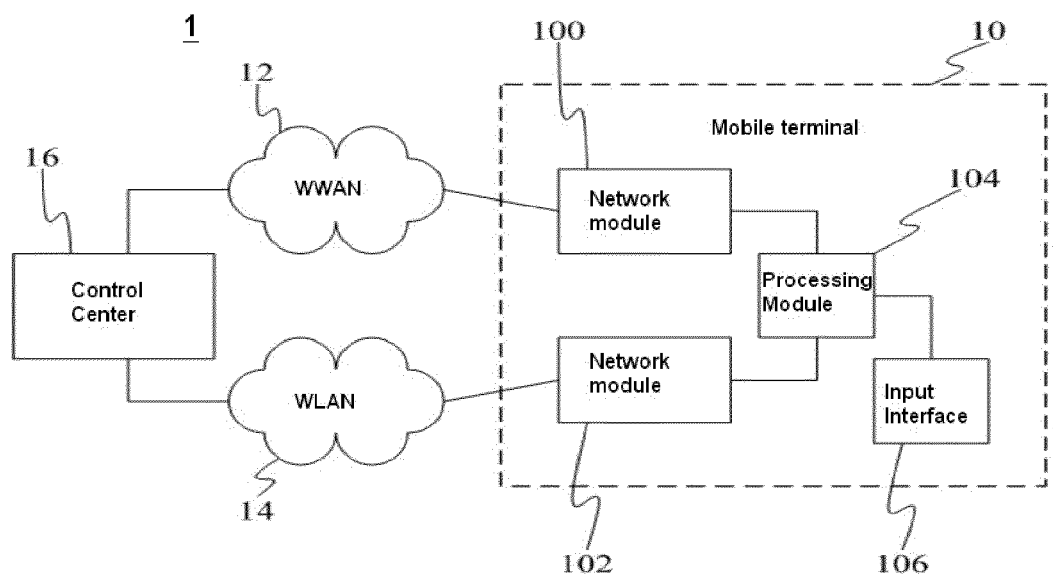
FIG. 1 is a functional block diagram illustrating the system contains the mobile terminal, the control center, the WWAN and the WLAN.

FIG. 1 illustrates a function block diagram of one embodiment of a communication system 1. The communication system 1 contains a mobile terminal 10, a wireless wide area network WWAN 12, a wireless local network WLAN 14 and a control center 16. The WWAN 12 can be a GSM, GPRS, WCDMA or 4 G network based on LTE. The WLAN 14 can be a WiMax, WiFi or Bluetooth network. The control center 16 controls operations of mobile terminals, including handoff functions. The control center can be a VLR or HLR in the communication system. The control center 16, the WWAN 12 and The WLAN 14 can be integrated into a FMC (fixed-mobile convergence) system and the mobile terminal 10 is adapted for a FMC mobile terminal accordingly.

The mobile terminal 10 contains a processing module 104, an input interface 106, a first wireless module 100 and a second wireless module 102. The first wireless module 100 can be selectively turning on and turning off for connecting the WWAN 12. The first wireless module 100 is a WWAN RF receiving module for receiving a WWAN signal and detecting a WWAN signal level of the WWAN signal. The second wireless module 102 is a WLAN RF receiving module for receiving a WLAN signal and detecting a WLAN signal level of the WLAN signal. The second wireless module 102 can connect an access point of the WLAN 14.

The processing module 104 couples to the first wireless module 100 and the second wireless module 102. In a conventional wireless system, the processing module 104 sends the WWAN signal level and the WLAN signal level to the control center 16 for determining whether the mobile terminal is needed to handoff from the WLAN to the WWAN. In this invention, the processing module 104 calculated a modified signal level according to the WLAN signal level and a compensation value. Instead of sending the WLAN signal level, the processing module 104 sends the modified signal level to the control center. From the point of the control center, when the control center 16 receives the modified signal level, the control center 16 uses the modified signal level to determine the handoff issues as it were the WLAN signal level.

The processing module 104 stores different communication modes in the mobile terminal 10. The communication modes corresponding to different compensation rules and values. For example, when a first communication mode is to extend the coverage of the WLAN, the compensation rule is "the modified signal level is the first signal level plus a compensation value". Another example, when the second communication mode is to reduce the coverage of the WLAN, the compensation rule is "the modified signal level is the first signal level minus a compensation value". The compensation value can be arranged as the user's requirements or preset by the mobile terminal.

The control center 16 stores a first threshold and a second threshold for determining the handoff functions of the mobile terminals in the system. When the control center 16 receives the WWAN signal level and the modified signal level from the mobile terminal 10, the control center 16 compares the modified signal level to the first threshold and compares the WWAN signal level to the second threshold. If the modified signal level is lower than the first threshold, the control center assumes the mobile terminal 10 is about reach the boundary of the WLAN coverage. If the WWAN signal is greater than the second threshold, the signal level of WWAN is high enough for connecting to the mobile terminal 10. The control center 16 sends a switching command to the mobile terminal 10 and the mobile terminal 10 starts switching the connection to the WLAN 14 to WWAN 12 and disconnects the connection to the WLAN 14. The control center 16 can also consider other factors when it sends the switching command, for example: the service charge schedule of the mobile terminal 10, the user's working time etc.

Figure 2:
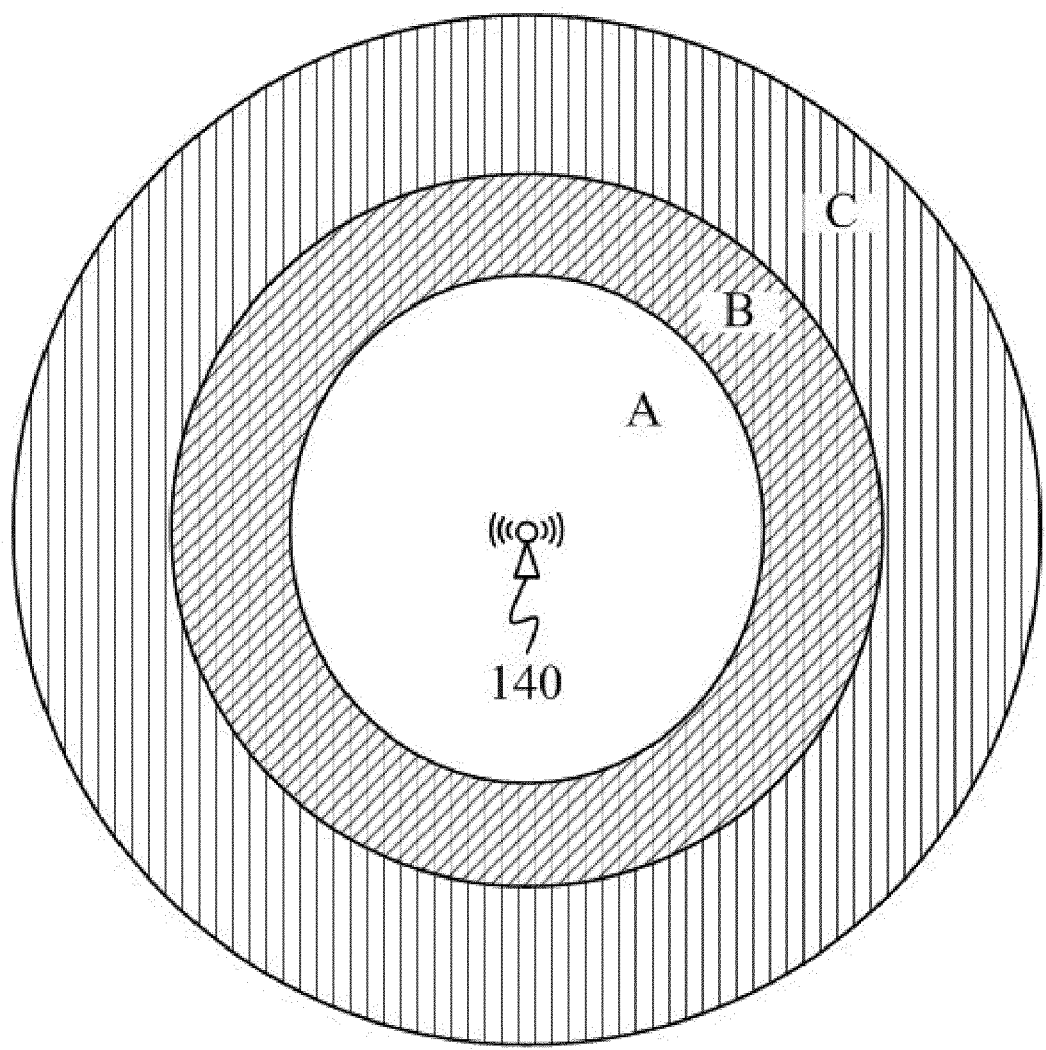
FIG. 2 is an adjustable coverage of the WLAN.

FIG. 2 illustrates different communication zones of a access point 140 which belongs to the WLAN 14. There are three different zones in this example. The number of zones can be adjusted according the user's requirements. Zone A has the smallest coverage with the best communication quality for the mobile terminal 10. Zone C has the largest coverage and the outer ring area having the poorest communication quality for the terminal 10. The coverage and the communication quality of zone B is set between zone A and zone C. In this invention, the communication quality is determined by the signal levels of the access point 140 received by the mobile terminal 10.

The user of the mobile terminal 10 can select one of the communication modes from the input interface 106. If the user stays in an open area, for example in a school or a stadium, and he may not want to handoff the connection to WWAN 12 and using the WLAN 14 for saving the fee of the mobile terminal 10. He may want to chose zone C and most of time the mobile terminal 10 connects the access point 140 for voice/data service.

As the communication quality of zone C is workable but not good enough, because of the signal level of the access point 140 is lower than signal levels in zone B or zone A. Some users prefer use the service of the access point 140 in zone A only because of better signal quality. When the mobile terminal 10 is crossing the boundary of zone A, it switches to the WWAN 12 for keeping the communication quality.

In FIG. 2, the signal levels of the signal transmitted by the access point 140 at the boundaries of zone A, zone B and zone C are a1, a2 and a3, wherein a1>a2>a3. A compensation value is δ and the handoff threshold set as a2. Assuming the received signal level is x at the mobile terminal side. Normally, when a mobile terminal is connecting to the access point 140 and passing from zone B to zone C, the received signal level x of the access point 140 comes to smaller than a2. Then the mobile terminal handoff from the access point 140 to the WWAN at the boundary of zone B. The following examples explain how this invention works.

Example 1

When the user prefers communicating in zone A only. The compensation rule makes the modified signal level is (x−δ). When the mobile terminal stays in zone A and comes to the boundary of zone A, the modified signal level equals (a1−δ). If (a1−δ)=a2, the mobile terminal handoffs from the access point 140 to the WWAN at the boundary. Because the control center 16 only gets the value of the WLAN signal level from the mobile terminal reported. In this example, when the mobile terminal crosses the boundary of zone A comes to zone B and reports the modified signal level<(a1−δ)=a2 to the control center 16. The control center 16 assumes the mobile terminal is crossing the boundary of zone B and sends switching commands to the mobile terminal.

Example 2

When the user prefers extending the communicating area to zone C. The compensation rule makes the modified signal level is (x+δ). When the mobile terminal crosses the boundary of zone B comes to zone C, the modified signal level is (a2+δ), still higher than the threshold a2. When the mobile terminal comes to the boundary of zone C, the modified signal level equals (a3+δ). If (a3+δ)=a2, the mobile terminal handoffs from the access point 140 to the WWAN at the boundary of zone C.

Figure 3:
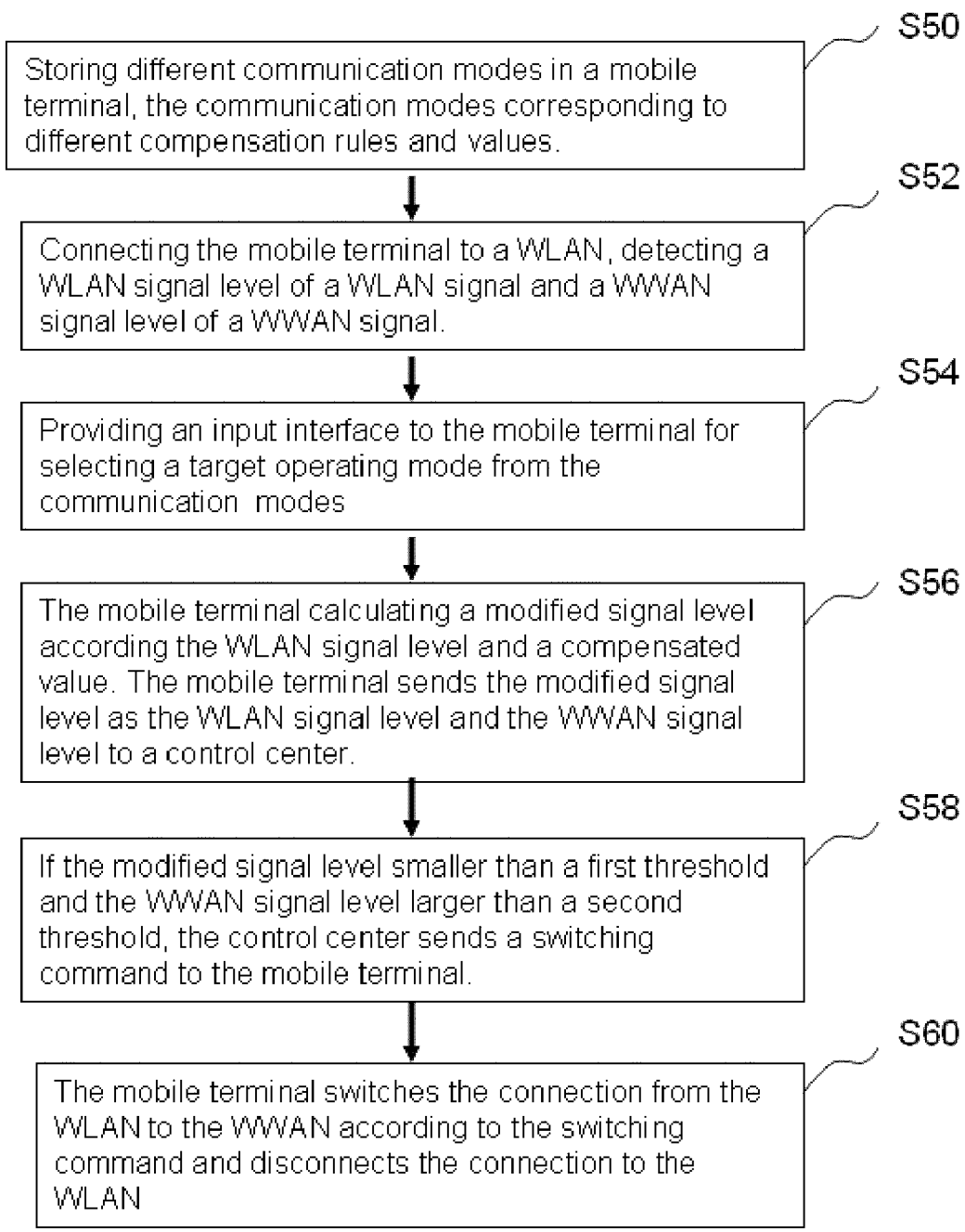
FIG. 3 is a flow diagram generally showing one embodiment for the mobile terminal adjusting the coverage of the WLAN.

FIG. 3 illustrates a flow diagram showing one embodiment of the method for the mobile terminal adjusting the communication area of the WLAN. The method is adopted to the system shown on the FIG. 1. At block S50, a mobile terminal stores different communication modes. The communication modes corresponding to different compensation rules and values.

At block S52, connecting the mobile terminal to a WLAN, detecting a WLAN signal level of the WLAN signal and a WWAN signal level of the WWAN signal.

At block S54, providing an input interface of the mobile terminal for selecting a target operating mode from the operating modes.

At block S56, the mobile terminal calculates a modified signal level according the WLAN signal level and a compensated value. The mobile terminal sends the modified signal level as the WLAN signal level and the WWAN signal level to a control center.

At block S58, if the modified signal level smaller than a first threshold and the WWAN signal level larger than a second threshold, the control center sends a switching command to the mobile terminal. At block S60, the mobile terminal switches from the WLAN to the WWAN according to the switching command. The mobile terminal disconnect the connection to the WLAN concurrently.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A mobile terminal for selectively connecting to a wireless wide area network (WWAN) and a wireless local area network (WLAN), the WWAN and the WLAN connecting to a control center, the mobile terminal comprising:
    a first network module making a connection to the WLAN and detecting a first signal level of a first signal transmitted by the WLAN; and
    a second network module for detecting a second signal level of a second signal transmitted by the WWAN; and
    a processing module calculating a third signal level according to a first compensation value and the first signal level, the processing module sending the third signal level and the second signal level to the control center;
    wherein when the third signal level is smaller than a first threshold and the second signal level is greater than a second threshold, the control center sends a switch command to the processing module and the mobile terminal switches the connection from the WLAN to the WWAN,
    wherein when the third signal level is greater than the first signal level, there is a first coverage for the mobile terminal in the WLAN and when the third signal level is smaller than the first signal level, there is a second coverage for the mobile terminal in the WLAN, the first coverage is greater than the second coverage.

2. The mobile terminal of claim 1, further comprising:
    an input interface for selecting a target operating mode from a plurality of operating modes, each of the operating modes is related a compensation value, wherein when the target operating mode is corresponding to the first compensation value and when the third signal level is the first signal level plus the first compensation value, a communication coverage of the WLAN extends.

3. The mobile terminal of claim 2, wherein when the third signal level is the first signal level minus the first compensation value, the communication coverage of the WLAN reduces.

4. The mobile terminal of claim 1, wherein the third signal level is the first signal level selectively adding the first compensation value and minus the first compensation value.

5. The mobile terminal of claim 1, wherein a WWAN coverage of the WWAN covers a WLAN coverage of the WLAN.

6. The mobile terminal of claim 1, wherein the control center stores the first threshold and the second threshold and controls switching functions of a plurality of mobile terminals.

7. A wireless communication system, comprising:
a wireless wide area network (WWAN);
a wireless local area network (WLAN);
a control center connecting to the WWAN and the WLAN; and
a mobile terminal having an input interface for selecting a target operating mode from a plurality of operating modes, the target operating mode is corresponding to a first compensation value, the mobile terminal making a connection to the WLAN and detecting a first signal level of a first signal transmitted by the WLAN and detecting a second signal level of a second signal transmitted by the WWAN, the mobile terminal calculating a third signal level according to the first compensation value and the first signal level, the mobile terminal sending the third signal level and the second signal level to the control center, wherein when the target operating mode is extending a communication coverage of the WLAN, the third signal level is the first signal level plus the first compensation value and when the target operating mode is reducing the communication coverage of the WLAN, the third signal level is the first signal level minus the first compensation value;
wherein when the third signal level is smaller than a first threshold and the second signal level is greater than a second threshold, the control center sends a switch command to the mobile terminal for switching the connection from the WLAN to the WWAN.

8. The wireless communication system of claim 7, wherein the wireless communication system is a fixed-mobile convergence system.

9. The wireless communication system of claim 7, wherein the control center stores the first threshold and the second threshold and controls switching functions of a plurality of mobile terminals.

10. A method for a mobile terminal selectively connecting to a wireless wide area network (WWAN) and a wireless local area network (WLAN), the WWAN and the WLAN connecting to a control center, the method comprising:
storing a plurality of operating modes in the mobile terminal;
providing an input interface of the mobile terminal for selecting a target operating mode from the operating modes, wherein the target operating mode is corresponding to a first compensation value;
making a connection between the mobile terminal and the WLAN;
the mobile terminal detecting a first signal level of a first signal transmitted by the WLAN and a second signal level of a second signal transmitted by the WWAN;
the mobile terminal calculating a third signal level according to the first compensation value and the first signal level, wherein when the target operating mode is extending a communication coverage of the WLAN, the third signal level is the first signal level plus the first compensation value, when the target operating mode is reducing the communication coverage of the WLAN, the third signal level is the first signal level minus the first compensation value; and
sending the third signal level and the second signal level to the control center;
wherein when the third signal level is smaller than a first threshold and the second signal level is greater than a second threshold, the control center sending a switch command to the mobile terminal and the mobile terminal switches the connection from the WLAN to the WWAN.

11. The method of claim 10, wherein a WWAN coverage of the WWAN covers a WLAN coverage of the WLAN.

12. The method of claim 10, wherein the control center stores the first threshold and the second threshold and controls switching functions of a plurality of mobile terminals.

13. A mobile terminal for selectively connecting to a wireless wide area network (WWAN) and a wireless local area network (WLAN), the WWAN and the WLAN connecting to a control center, the mobile terminal comprising:
a first network module making a connection to the WLAN and detecting a first signal level of a first signal transmitted by the WLAN; and
a second network module for detecting a second signal level of a second signal transmitted by the WWAN;
an input interface for selecting a target operating mode from a plurality of operating modes, each of the operating modes is related a compensation value, the target operating mode corresponding to a first compensation value; and
a processing module calculating a third signal level according to the first compensation value and the first signal level, the processing module sending the third signal level and the second signal level to the control center, wherein when the third signal level is the first signal level plus the first compensation value, a communication coverage of the WLAN extends, when the third signal level is the first signal level minus the first compensation value, the communication coverage of the WLAN reduces;
wherein when the third signal level is smaller than a first threshold and the second signal level is greater than a second threshold, the control center sends a switch command to the processing module and the mobile terminal switches the connection from the WLAN to the WWAN.

14. The mobile terminal of claim 13, wherein a WWAN coverage of the WWAN covers a WLAN coverage of the WLAN.

15. The mobile terminal of claim 13, wherein the control center stores the first threshold and the second threshold and controls switching functions of a plurality of mobile terminals.

* * * * *